(No Model.) 7 Sheets—Sheet 4.

G. G. CROSBY.
MACHINE FOR SEPARATING MAGNETIC FROM NON MAGNETIC SUBSTANCES.

No. 511,512. Patented Dec. 26, 1893.

WITNESSES:
W. B. Harris
Jas. C. Warner

INVENTOR
George G. Crosby
BY
W. L. Bennem
ATTORNEY (No Model.) 7 Sheets—Sheet 6.

G. G. CROSBY.
MACHINE FOR SEPARATING MAGNETIC FROM NON MAGNETIC SUBSTANCES

No. 511,512. Patented Dec. 26, 1893.

Witnesses
M. B. Harris
John W. Ripley

Inventor
George G. Crosby
By W. L. Remmem
Attorney (No Model.) 7 Sheets—Sheet 7.

G. G. CROSBY.
MACHINE FOR SEPARATING MAGNETIC FROM NON MAGNETIC SUBSTANCES.

No. 511,512. Patented Dec. 26, 1893.

Witnesses
M. B. Harris
John W. Ripley

Inventor
George G. Crosby
By
W. L. Bennem
Attorney

UNITED STATES PATENT OFFICE.

GEORGE G. CROSBY, OF NEW YORK, N. Y., ASSIGNOR TO THE MAGNETIC IRON MILLING COMPANY, OF TENNESSEE.

MACHINE FOR SEPARATING MAGNETIC FROM NON-MAGNETIC SUBSTANCES.

SPECIFICATION forming part of Letters Patent No. 511,512, dated December 26, 1893.

Application filed January 11, 1893. Serial No. 458,011. (No model.)

*To all whom it may concern:*

Be it known that I, GEORGE G. CROSBY, of the city, county, and State of New York, have invented a certain new and useful Improvement in Machines for Separating Magnetic from Non-Magnetic Substances, of which the following is a specification.

This machine is particularly well adapted for separating the magnetic particles of iron from magnetic iron sands, although it is not confined to such sands, as it is applicable to pulverized ores.

I will describe a machine embodying my improvement and then point out the novel features in claims.

Figure 1:
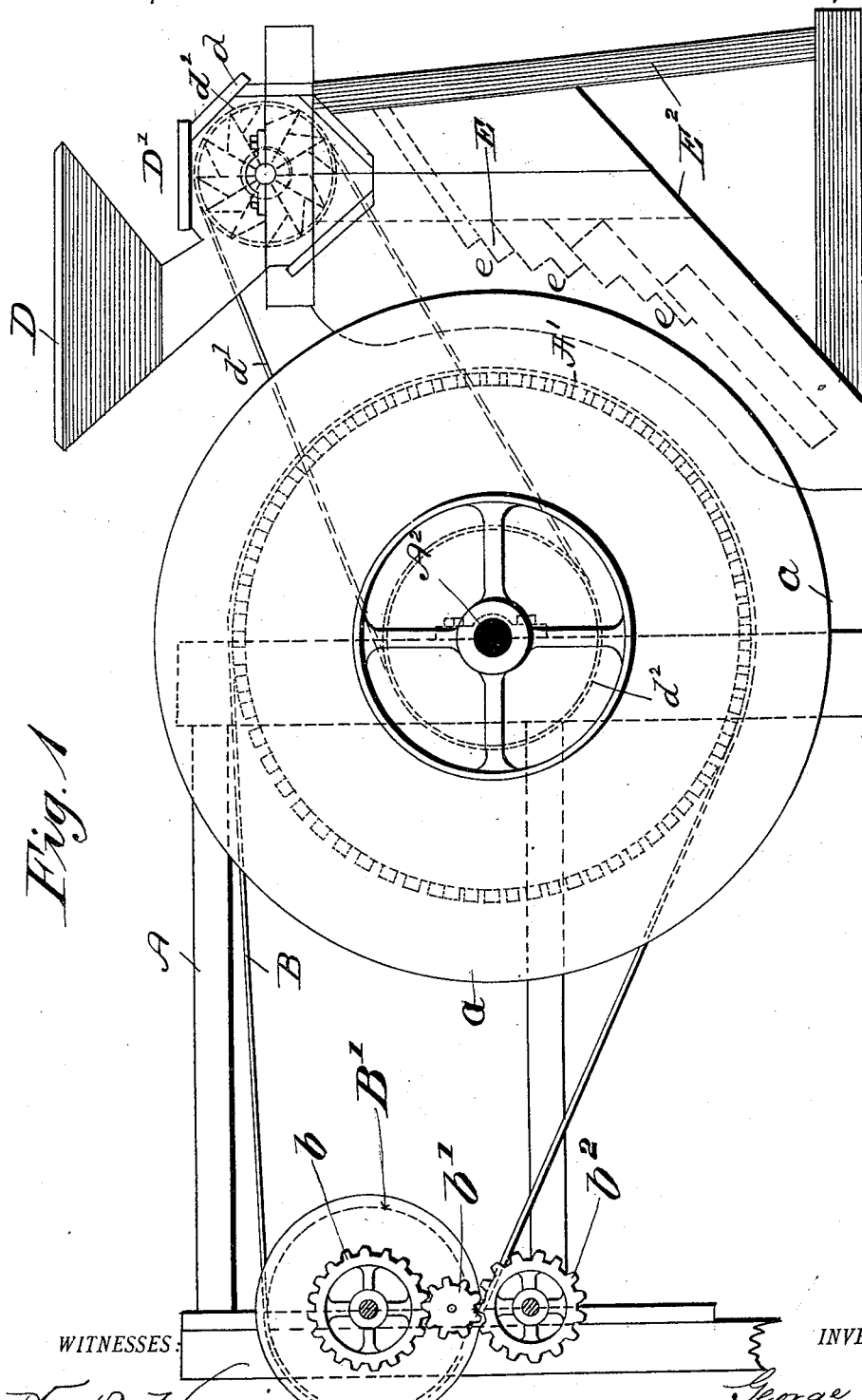
Figure 2:
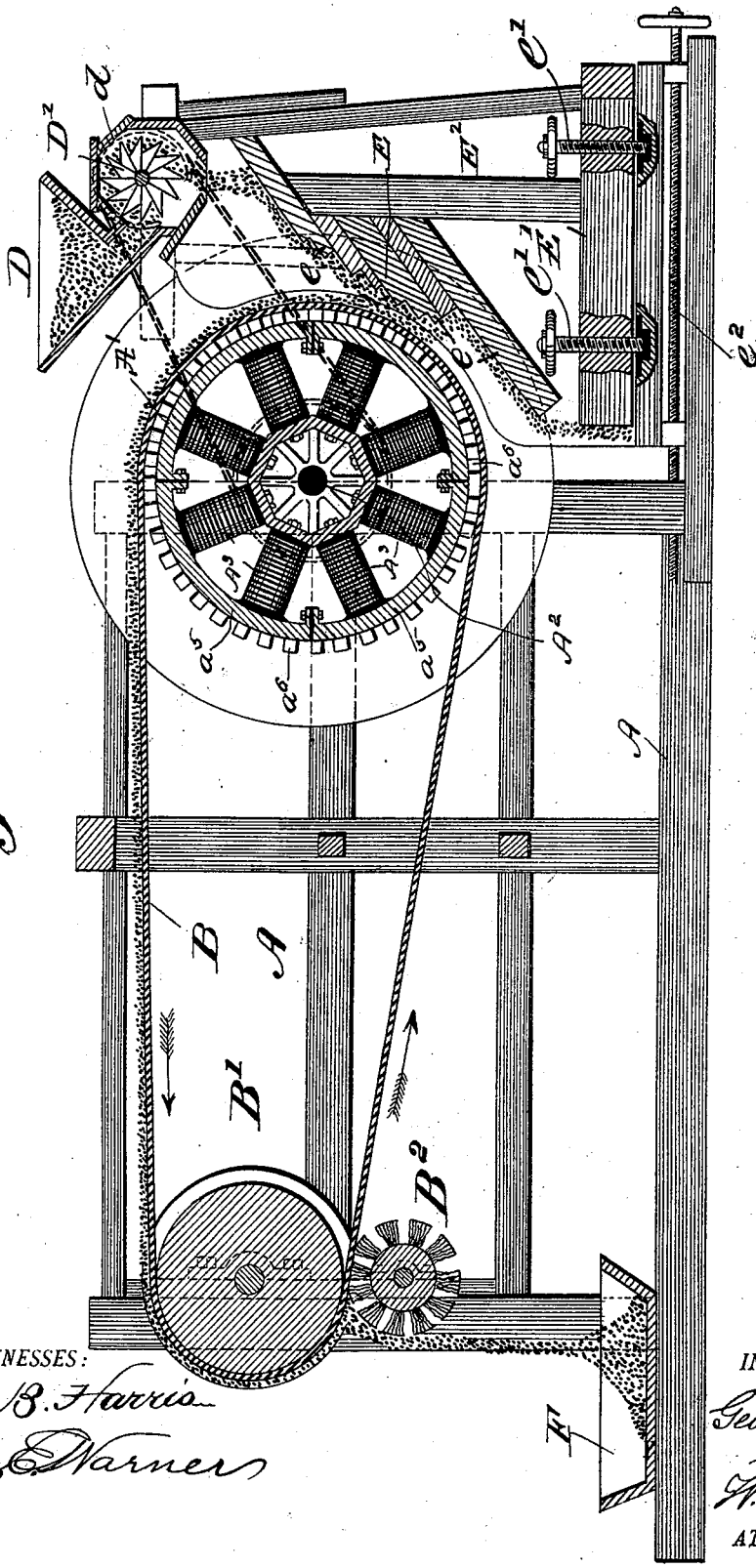
Figure 3:
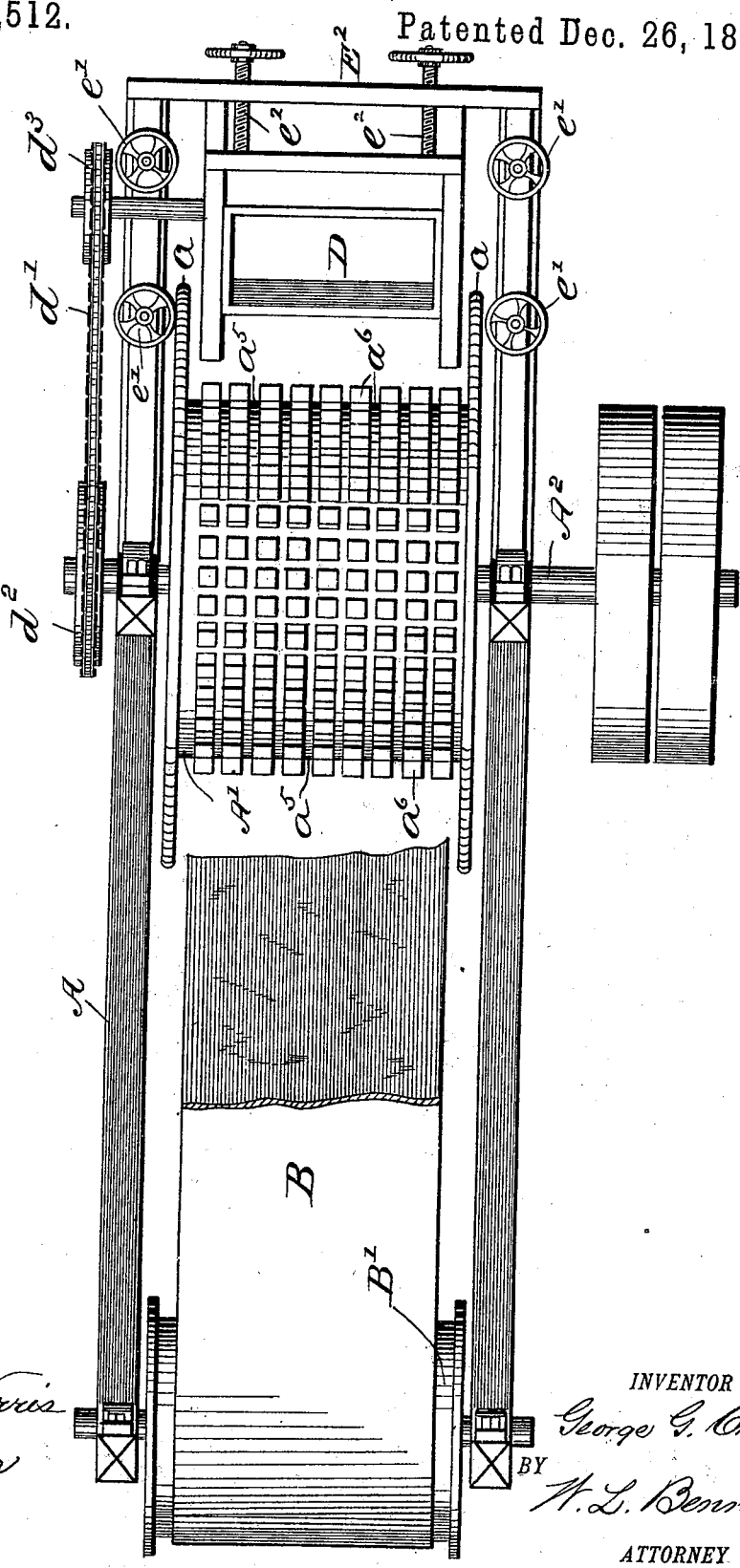
Figure 4:
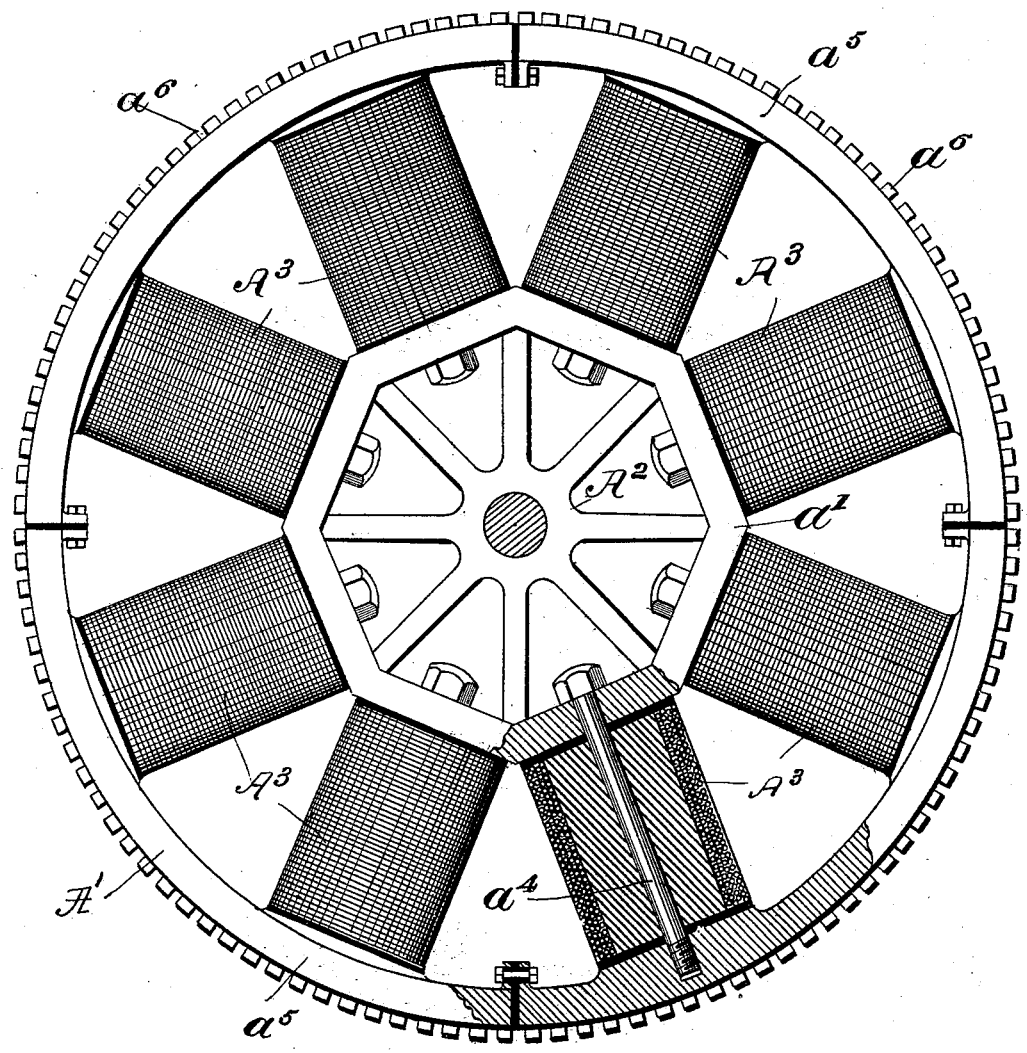
Figure 5:
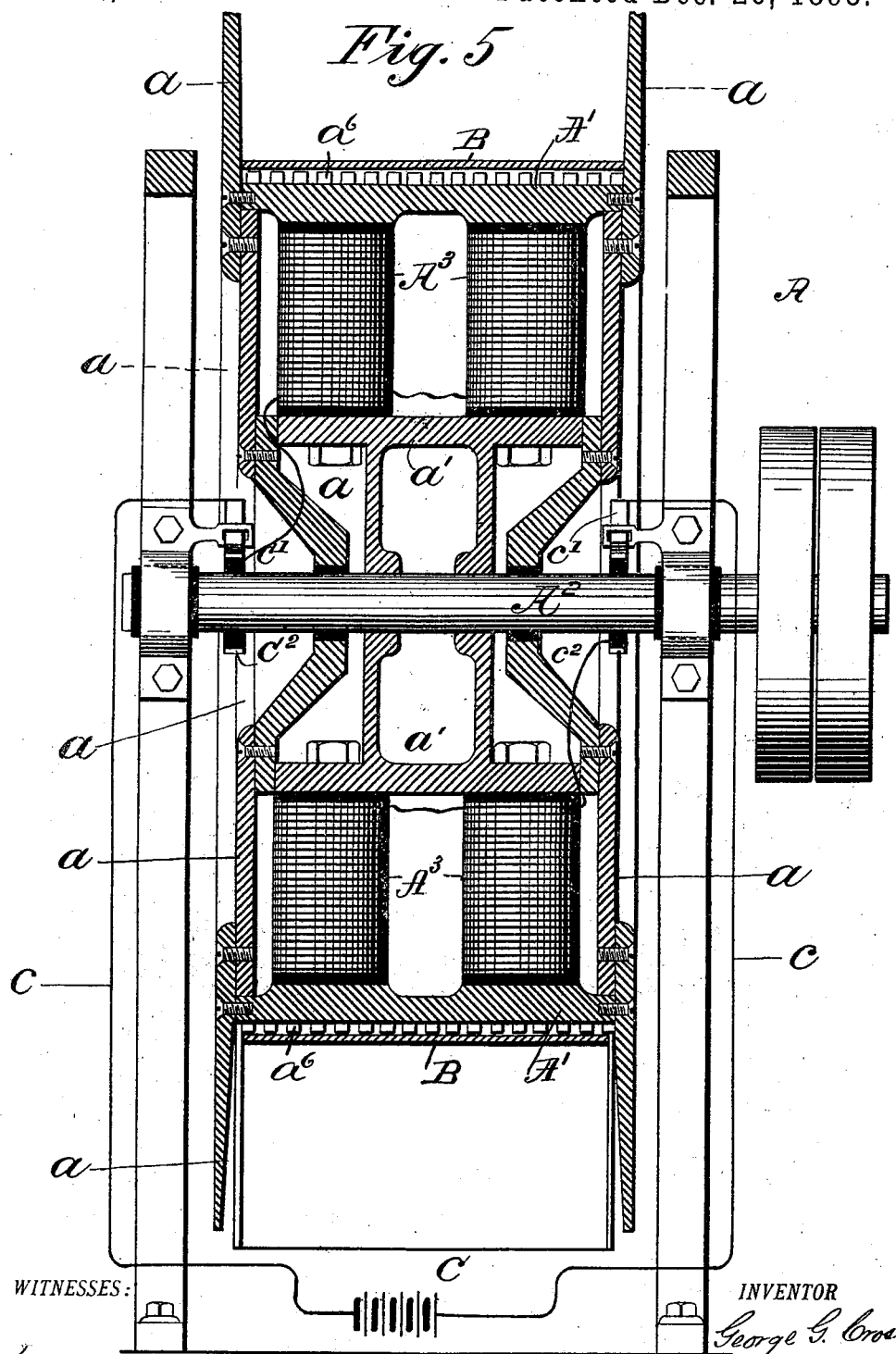
Figure 6:
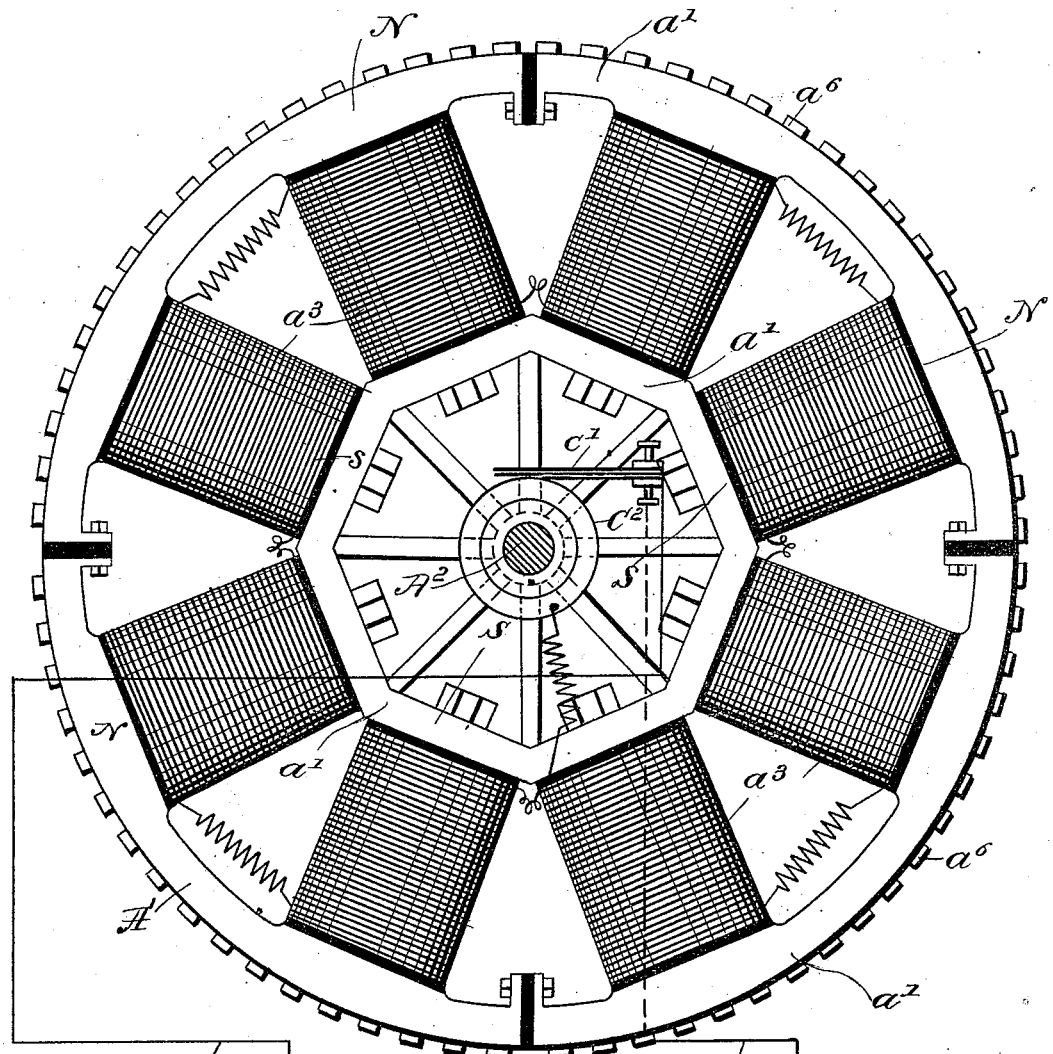
Figure 7:
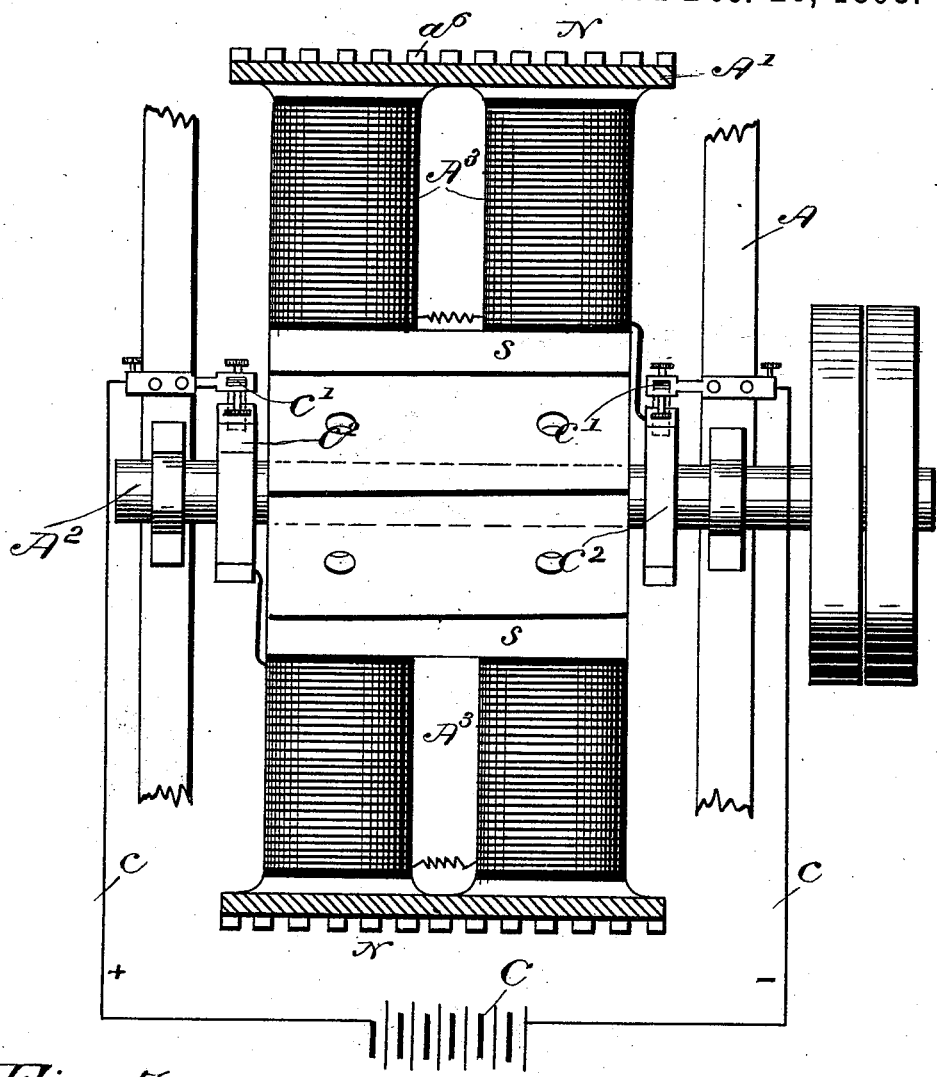
Figure 8:
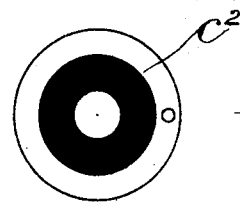
Figure 9:
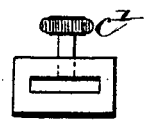
Figure 10:
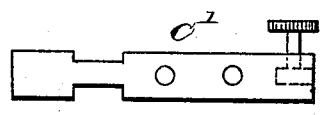

In the accompanying drawings, Figure 1, is a side elevation of a separator embodying the improvement. Fig. 2, is a longitudinal section thereof. Fig. 3, is a top or plan view. Fig. 4, is an enlarged view of a portion of the machine. Fig. 5, is a transverse vertical section. Fig. 6 shows a side elevation of an electric magnetic drum mounted on a metal shaft showing the coils and their connection with the commutators. Fig. 7 is a transverse vertical view of a portion of the machine, partly in section and partly in elevation, and Figs. 8, 9 and 10 are detail views thereof.

Referring by letter to the drawings, A, designates the main frame of the separator, consisting of non-magnetic material, preferably of wood.

A′, shows an electro-magnetic drum mounted on a metal shaft, $A^2$, having bearings in non-magnetic boxes on the main frame A.

The wheel consists in part of non-magnetic material, which may be wood, the said parts (the heads) being lettered $a$, and an inner annular rim consisting of a base $a'$ of soft iron or similar metal. A series of electro-magnets $A^3$, is secured to the rim $a'$ by means of core bolts $a^4$, the outer ends of which connect with segmental field pieces $a^5$. I prefer to use several of these segmental field pieces; that is as many segments as there are pairs of electro-magnets $A^3$, and the adjacent ends of the segments are rigidly connected together but insulated from each other, so that each segment may assume a north or south pole. I find that better results are obtained by providing the surface of the segments $a^5$, with salient portions or radial projections $a^6$. These projections $a^6$ are integral with the segments and are arranged closely together over the entire surface of the segments.

B, designates a carrier in the form of an endless belt, of non-magnetic material, extended around the magnetic wheel A′, and around a drum or roller, B′, having journal bearings in the main frame A. The upper surface of the drum or roller B′, is substantially on a horizontal plane with the upper surface of the wheel A′, so that the upper portion of the carrier will move in a substantially horizontal plane.

The electro-magnets $A^3$, are continuously energized from any desired source. I have shown means consisting of a battery C, having connections $c$, with brushes C′, supported from the main frame and engaging with commutators $C^2$, mounted on the shaft $A^2$. A gear $b$ mounted on the shaft of the drum or roller B′, meshes with a gear $b'$, which meshes with a gear $b^2$, upon the shaft of which is mounted a cleaner or brush $B^2$, bearing upon the carrier B, and serving to clear off material that may have a tendency to adhere thereto.

I will now describe the means for feeding material to be separated to the action of the machine. D, designates a hopper, having communication through its lower portion with a casing $d$, within which a rotary bucket wheel or carrier D′, is arranged. This bucket wheel is rotated from the shaft $A^2$, as here shown, by means of a sprocket chain $d'$, engaging with a sprocket wheel $d^2$ on the shaft $A^2$, and a sprocket wheel $d^3$, on the extended shaft of the bucket wheel. Material carried around by the bucket wheel D′, is discharged through an opening in the bottom of the casing $d$, onto an inclined chute E. It is desired that material running down this chute shall have its particles turned over as often as possible, so that all the magnetic iron particles will be free to be attached to the wheel without inclosing any non-magnetic particles, thereby making a clean separation of magnetic from non-magnetic particles. For this purpose I provide it with a series of steps $e$, which extend transversely of the chute. The chute is adjustable vertically, and also toward and from the wheel A′. The chute is mounted or built in a frame E', mounted on a carriage E². Screws e' extended through tapped holes in cross-bars of the frame E', and having a swivel or similar connection with the carriage E², serve to adjust the frame and chute vertically, and screws e² extended horizontally through tapped holes in cross-bars of the carriage E², and engaged with the main frame A, serve to adjust the parts toward and from the wheel A'. The hopper D, the casing d, and the bucket-wheel D', are also mounted on the frame E', and when the parts are adjusted the sprocket chain d', may be lengthened or shortened as required.

In operation the electric circuit is closed and the wheel A', set in rotation from any desired source of power. Then material to be separated is placed in the hopper D, and allowed to fall into the chute E. As the material reaches the wheel A', the iron or magnetic portions of the material will be attracted and adhere to the carrier B, through the influence of the electro-magnets, and be carried over and deposited in a receptacle F. The non-magnetic portion of the material will discharge off the lower end of the chute E, into a receptacle placed to receive it.

Having described my invention, what I claim is—

1. In a machine of the class described, the combination with a source of electricity, of a series of electro-magnets, the segmental field pieces having the integral salient radial portions, arranged closely together over the entire surface of the segments and the carrier, substantially as specified.

2. In a machine of the class described, the combination with an electro-magnetic wheel and the carrier, of the hopper, the casing having communication therewith, the bucket wheel in the casing, the chute, and the longitudinally and vertically adjustable frame or carriage supporting said hopper, casing, bucket, wheel and chute, substantially as specified.

3. The combination with a carrier and the electro-magnetic wheel, of the feeder comprising a chute having steps, and adjustable vertically and horizontally relatively to the said wheel, substantially as specified.

4. The combination with the carrier, the electro-magnetic wheel, and the main frame, of the longitudinally adjustable carriage, the frame vertically adjustable on said carriage, the chute, the hopper and the bucket wheel mounted in said movable frame, substantially as specified.

GEORGE G. CROSBY.

Witnesses:
JAS. E. WARNER,
LOUIS DUBOIS.